United States Patent
Lu

[19]

[11] Patent Number: 6,025,758
[45] Date of Patent: Feb. 15, 2000

[54] METHOD AND APPARATUS FOR PERFORMING DIGITAL DATA SIGNAL MODULATION

[75] Inventor: Keh-Shehn Lu, San Diego, Calif.

[73] Assignee: Uniden San Diego Research & Development Center, Inc., San Diego, Calif.

[21] Appl. No.: 08/961,392

[22] Filed: Oct. 30, 1997

[51] Int. Cl.[7] .............................. H04L 27/28; H04L 27/10
[52] U.S. Cl. ......................... 332/100; 375/274; 375/275; 375/305
[58] Field of Search ..................................... 375/275, 304, 375/222, 274, 305; 332/100

[56] References Cited

U.S. PATENT DOCUMENTS 4,339,724  7/1982  Feher ....................................... 327/129
4,567,602  1/1986  Kato et al. ............................... 375/296

OTHER PUBLICATIONS

Modem Principles and Architectures by Dr. Kamilo Feher, pp. 164–175.

*Primary Examiner*—Arnold Kinkead
*Attorney, Agent, or Firm*—Hoffman & Baron, LLP

[57] ABSTRACT

The present invention includes a method for generating a GMSK modulating signal from a serial digital data bit stream whereby the GMSK modulating signal modulates a carrier frequency signal associated with a GMSK transmitter of a digital communications system. Specifically, the method includes converting each set of m consecutive data bits of the bit stream into a parallel symbol, whereby there are $2^m$ possible symbols. Each symbol is generally defined as $(B_{-(m-1)} \ldots B_0)$, where $B_0$ is the current data bit and $B_{-(m-1)}$ is the mth previous data bit with respect to $B_0$. Next, a corresponding phase advance is assigned to each of the $2^m$ symbols, each phase advance being substantially equivalent to a percent phase advance contributed by the m consecutive data bits of each symbol. Also, four corresponding accumulated phases are assigned to each of the $2^m$ symbols, each accumulated phase being derived from a multiple of 90 degrees. Still further, digitally represented waveform portions are stored in a memory unit, each waveform portion respectively representing a time varying waveform that advances in phase by an amount respectively equal to each of the four accumulated phases. Next, the phase advance assigned to the current symbol is added to the phase advance accumulated from the previous symbol to yield a current accumulated phase for the current symbol. The memory unit is searched for the waveform portion that corresponds to the current accumulated phase and the portion is then outputted from the memory unit. The adding, searching and outputting steps are performed for each data bit of the digital data bit stream to form a digital representation of the GMSK modulating signal.

40 Claims, 6 Drawing Sheets

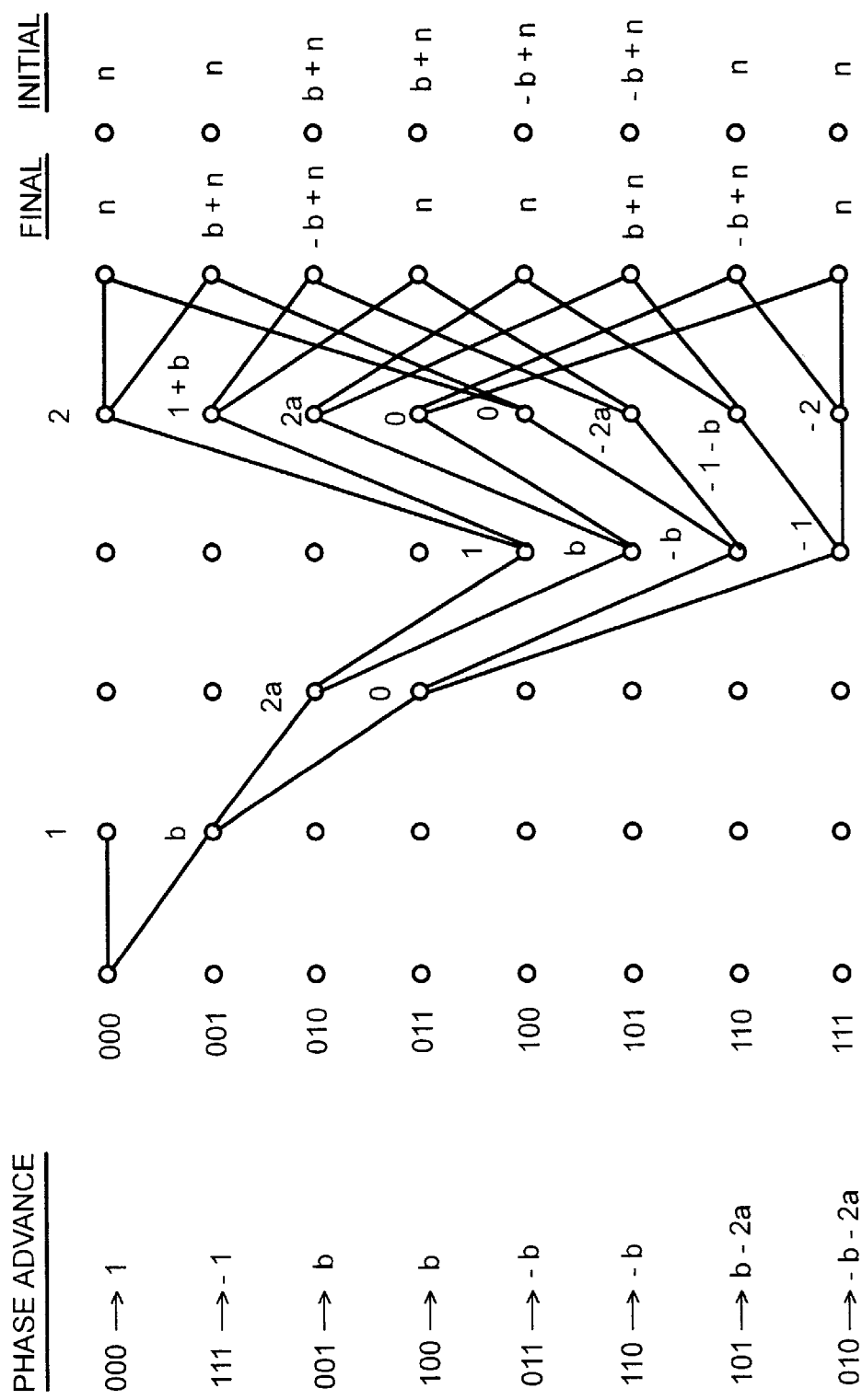

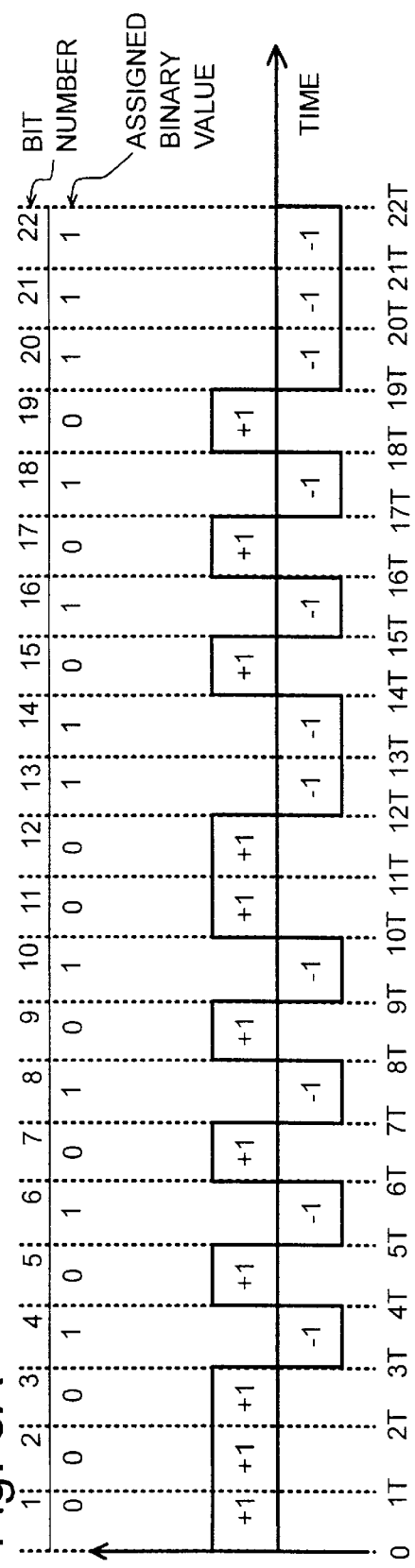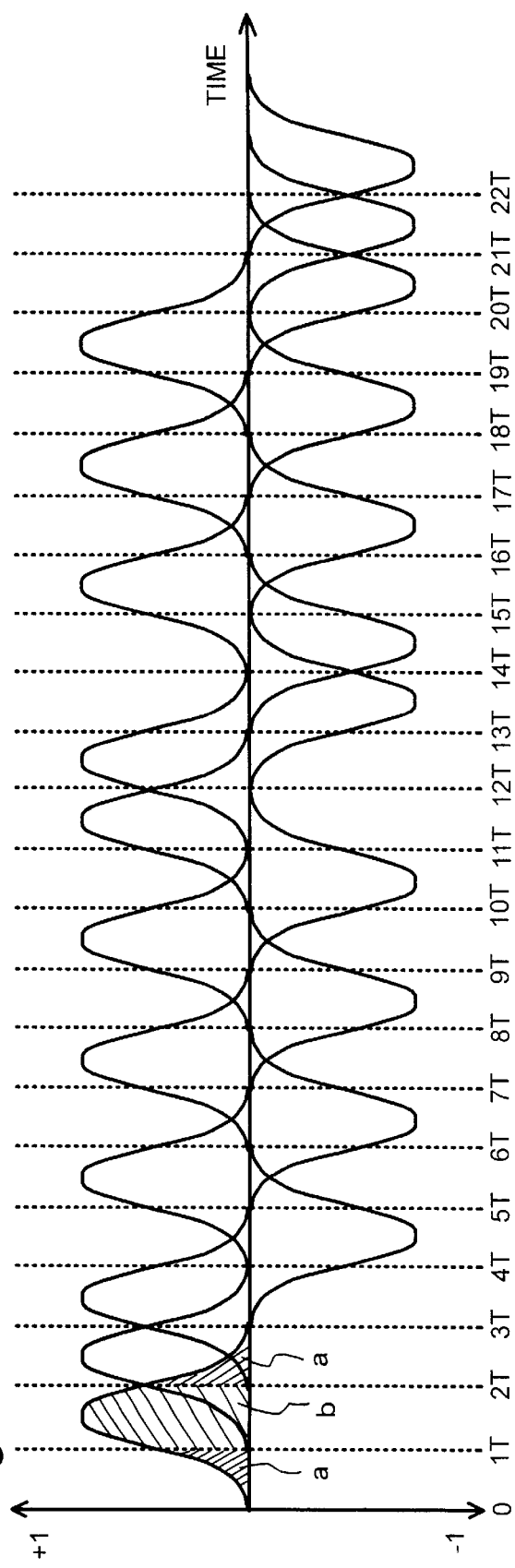

METHOD AND APPARATUS FOR PERFORMING DIGITAL DATA SIGNAL MODULATION

BACKGROUND OF THE INVENTION

1. Field of the Invention

This invention relates generally to digital data communications, and more specifically to methods and apparatus for performing GMSK (Gaussian minimum shift keying) modulation in a digital communications system.

2. Description of the Prior Art

Several types of binary modulation techniques are known in the digital communications art. Frequency shift keying (FSK), phase shift keying (PSK), quadrature phase shift keying (QPSK), offset quadrature phase shift keying (OQPSK), and minimum shift keying (MSK) techniques, to name a few, have been employed in various applications in order to maximize either transmitted power efficiency or communications channel bandwidth efficiency or, in some cases, both of these critical communications system performance indicators. It is to be appreciated that, in particular, MSK modulation may be described from either a frequency modulation or phase modulation point of view. Specifically, it is known that MSK modulation is basically a coherently orthogonal, continuous phase, FSK modulation technique whereby the frequency deviation between the two discrete signaling frequencies equals one half of the data bit rate. Alternatively, it is also known that MSK modulation may be viewed as an OQPSK modulation technique with sinusoidal pulse weighting, i.e., the input data bits are represented by sinusoidal pulses instead of rectangular pulses. Nonetheless, from whichever point of view MSK modulation is described, the resulting output transmitted signal exhibits a constant envelope and continuity of phase in the RF carrier at each data bit transition.

Another binary modulation technique known as Gaussian minimum shift keying (GMSK) is also known in the relevant art. A modulator employing the GMSK binary modulation technique basically consists of an MSK modulator with a Gaussian low pass filter operatively coupled to the input of the MSK modulator. FIG. 1 illustrates one such conventional GMSK modulator. The GMSK modulator illustrated in FIG. 1 is described, in part, in the text entitled Wireless Digital Communications by Dr. Kamilo Feher, pages 164–175, as well as, in part, in U.S. Pat. No. 4,339,724 to Feher and U.S. Pat. No. 4,567,602 to Kato et. al. It is to be appreciated that the GMSK modulator illustrated in FIG. 1 represents the MSK modulation portion of the system from the above-mentioned quadrature phase modulation point of view.

Specifically, the conventional GMSK modulator illustrated in FIG. 1 includes a Gaussian low pass filter 2 operatively coupled to a non-return-to-zero (NRZ) bit stream source, an integrator 4 operatively coupled to a Gaussian low pass filter 2, and a signal splitter 6 operatively coupled to the integrator 4. The conventional GMSK modulator also includes a cosine look-up table 8 operatively coupled to the signal splitter 6, a sine look-up table 10 also operatively coupled to the signal splitter 6, a local oscillator 12, an in-phase mixer 14 operatively coupled to the local oscillator 12 and the cosine look-up table 8, a 90 degree phase shifter 16 operatively coupled to the local oscillator 12, a quadrature mixer 18 operatively coupled to the 90 degree phase shifter 16 and the sine look-up table 10, and a summer operatively coupled to the in-phase mixer 14 and the quadrature mixer 18.

The conventional GMSK modulator illustrated in FIG. 1 basically operates in the following manner. A standard NRZ input data bit stream, including individual bits having a value of either +1 or −1, corresponding to the information to be transmitted, is presented to the Gaussian low pass filter 2. An NRZ input bit stream may be generally represented as:

$$a(t) = \sum_{n=-\infty}^{\infty} a_n \prod\left(\frac{t - nT_B}{T_B}\right)$$

where $a_n = +/-1$, $T_B$ is the bit interval, and $\pi(t/T_B)$ is a rectangular pulse, where $\pi(t/T_B)$ is represented as:

$$\prod(t/T_B) = \begin{cases} 1 & 0 \leq t \leq T_B \\ 0 & \text{elsewhere} \end{cases}$$

It is to be appreciated that the Gaussian low pass filter 2 is included as a pre-modulator filtering stage and serves the purpose of reducing the bandwidth of the main lobe and spectral density of the sidelobes associated with the transmitted GMSK output signal (i.e., bandwidth limiting the transmitted output signal). The frequency response of a Gaussian low pass filter is generally represented as:

$$G(f) = \exp\left[-\left(\frac{f}{B}\right)^2 \left(\frac{\ln 2}{2}\right)\right]$$

where B represents the 3dB bandwidth of the Gaussian low pass filter.

The output signal from the Gaussian low pass filter 2 may best be described as representing a frequency variation whereby a first frequency (e.g., 1 Hz) may be associated with an input data bit equal to −1 and a second frequency (e.g., 2 Hz) may be associated with an input data bit equal to +1. It is to be appreciated that the GMSK output signal, ultimately transmitted by the GMSK modulator, will in effect be a frequency modulated signal whereby a transmitted signal corresponding to a −1 data bit will have the first frequency (e.g., 1 Hz) associated therewith and a transmitted signal corresponding to a +1 data bit will have the second frequency (e.g. 2 Hz) associated therewith.

However, since the GMSK modulator output signal is transmitted in the time domain, integrator 4 is required to integrate the frequency variation associated with the output signal of the Gaussian low pass filter 2 and provide the corresponding phase variation associated with a sinusoidal signal (e.g., cosine signal) varying over time at the first frequency and the corresponding phase variation associated with a sinusoidal signal (e.g., cosine signal) varying over time at the second frequency. In other words, the integrator 4 samples the output signal of the Gaussian low pass filter 2 and determines the particular phase angle for each sample period (for a given sampling rate) whereby each phase angle is associated with the sinusoidal signals respectively corresponding to a +1 data bit and a −1 data bit. For example, assuming a period and bit interval of 1 second, a 1 Hz cosine signal will linearly vary in phase from 0 degrees (at time=0) to 360 degrees (at time=$T_b$) over such time period, while a 2 Hz cosine signal will linearly vary in phase from 0 degrees (at time=0) to 720 degrees (at time=$T_b$) in the same time period. Therefore, assuming a sampling rate of 0.01 seconds, it is known that the phase angle associated with the 1 Hz cosine signal at t=0.01 seconds will be 3.6 degrees, while the 2 Hz cosine signal will be 7.2 degrees. Similarly, at t=0.02 seconds, the 1 Hz cosine signal will progress to a phase angle of 7.2 degrees, while the 2 Hz cosine signal will progress to a phase angle of 14.4 degrees, and so on for each successive sampling time interval.

Next, this phase angle information for each sample is presented to the signal splitter 6 in order that the phase angle information from each sample may be split into an in-phase signal and a quadrature signal. The phase angle information contained in the in-phase signal is presented to the cosine look-up table 8, while the phase angle information contained in the quadrature signal is presented to the sine look-up table 10. The cosine and sine look-up tables, 8 and 10, provide the numeric value respectively corresponding to the cosine and sine of the phase angles associated with the samples presented thereto, e.g., cos 7.2 degrees 0.9221, sin 7.2 degrees= 0.1253, etc. Accordingly, a constructed cosine signal is generated from the numeric values associated with the samples and output from the cosine look-up table 8, while a constructed sine signal is likewise generated and output from the sine look-up table 10. The cosine signal represents an in-phase signal, x(t), and the sine signal represents a quadrature signal, y(t), which vary over time at the first frequency when one of the input data bits equals −1 and vary over time at the second frequency when one of the input data bits equals +1.

The in-phase signal is then mixed in the in-phase mixer 14 with the carrier frequency signal provided by the local oscillator 12, while the quadrature signal is mixed in the quadrature mixer 18 with the carrier frequency signal shifted by 90 degrees by phase shifter 16. A mixed in-phase output signal is presented to the summer 20 from the in-phase mixer 14 and a mixed quadrature output signal is presented to the summer 20 from the quadrature mixer 18. The summer 20 combines the mixed in-phase output signal and the mixed quadrature output signal to form the GMSK output signal to be transmitted.

Further, it is known that certain functions of the conventional GMSK modulator illustrated in FIG. 1 may be provided by a signal processor as disclosed in the above-mentioned article by Dr. Feher, for instance, whereby ROM (Read Only Memory) devices may be employed to provide the numeric values of the respective cosine and sine signals. However, the utilization of a signal processor with associated ROM devices in the above-described "sample by sample" approach for constructing the in-phase and quadrature modulating signals not only requires relatively large-sized ROM devices, but also disadvantageously monopolizes much of the signal processor's processing time and resources due to the fact that calculations associated with generating the cosine and sine signals must be repetitively performed for each sample. Given the fact that a relatively large number of samples must be taken per input data bit in order to accurately construct the in-phase and quadrature modulating signals, the processing efficiency of such conventional approach may be disadvantageously low.

Furthermore, the above-described conventional GMSK modulator suffers from several operational drawbacks, one such drawback being associated with the relative hardware complexity of such a GMSK modulator. While GMSK modulation, itself. provides known advantages and highly desirable features over other binary modulation approaches (e.g., increased bandwidth efficiency), the traditional GMSK modulator (see FIG. 1) requires more active components and processing stages than many other known modulators associated with alternate binary modulation techniques, e.g., QPSK. Therefore, it would be advantageous to be able to utilize the technique of GMSK modulation in a simpler, more efficient, modulator architecture as compared to those architectures previously known.

OBJECTS AND SUMMARY OF THE INVENTION

It is an object of the present invention to provide methods and apparatus for performing GMSK modulation in a bit by bit, ROM-based manner which yields increased operational efficiency over conventional GMSK modulator design architectures.

It is another object of the present invention to provide methods and apparatus for performing GMSK modulation in a bit by bit, ROM-based manner which is capable of tracking the phase advance associated with previous bits of an input data bit stream in order to determine the accumulated phase associated with a current bit of the input data bit stream.

It is yet another object of the present invention to provide methods and apparatus for performing GMSK modulation in a bit by bit, ROM-based manner which requires substantially smaller memory allocation than conventional GMSK modulation methods and apparatus.

It is a further object of the present invention to provide methods and apparatus for performing GMSK modulation in a bit by bit, ROM-based manner which requires substantially less computations per bit than conventional GMSK modulation methods and apparatus.

In accordance with one form of the present invention, a method for generating at least one GMSK modulating signal from a serial digital data bit stream in order that the at least one GMSK modulating signal may modulate a carrier frequency signal associated with a GMSK transmitter of a digital communications system, includes the step of converting each set of m consecutive data bits of the serial digital data bit stream into a parallel symbol. It is to be appreciated that there are $2^m$ possible symbols whereby each symbol is generally defined as $(B_{-(m-1)}, \ldots B_0)$, where $B_0$ is the current data bit and $B_{-(m-1)}$ is the mth previous data bit with respect to $B_0$. Next, the method includes assigning a corresponding phase advance to each of the $2^m$ symbols, each phase advance being substantially equivalent to a percent phase advance contributed by the m consecutive data bits of each symbol. Further, the present invention includes assigning at least four corresponding accumulated phases to each of the $2^m$ symbols, each of the at least four accumulated phases being derived from a multiple of 90 degrees. It is to be appreciated that the derivation of the phase advances and accumulated phases associated with each symbol will be explained later in the detailed description of the present invention.

Next, the method for generating at least one GMSK modulating signal, in accordance with the present invention, includes storing a plurality of digitally represented waveform portions in a memory unit. Preferably, the memory unit used to store the waveform portions is one or more ROM devices. Each one of the plurality of waveform portions respectively represents a time varying waveform that advances in phase by an amount respectively equal to each one of the at least four accumulated phases assigned to each of the $2^m$ symbols. Further, the method of the present invention includes adding the phase advance assigned to the current symbol to the phase advance accumulated from the previous symbol, i.e., the symbol immediately preceding the current symbol, in order to yield a current accumulated phase for the current symbol. Next, the method of the present invention teaches searching the memory unit for the digitally represented waveform portion that corresponds to the current accumulated phase for the current symbol and, then, outputting (reading out of memory) that digitally represented waveform portion from the memory unit. Accordingly, the method of the present invention includes performing the adding, searching and outputting steps, discussed above, for each data bit of the digital data bit stream in order to form a digital representation of the at least one GMSK modulating signal.

Preferably, the method further includes the step of converting each digitally represented waveform portion, which is output from the memory unit, to an analog representation thereof in order to form a corresponding analog representation of the at least one GMSK modulating signal. Furthermore, a preferred method also includes the step of filtering the at least one GMSK modulating signal after converting the same signal to an analog representation.

The GMSK modulation method of the present invention may preferably also include mixing the at least one GMSK modulating signal with a carrier frequency signal to form at least one GMSK modulated output signal. Also, it is to be appreciated that the method may preferably include outputting each digitally represented waveform portion, corresponding to each data bit, from the memory unit one sample at a time at a predetermined sampling rate. The sampling rate may preferably be a fraction of the bit period associated with each data bit of the serial digital data bit stream.

In a preferred embodiment of the GMSK modulation method of the present invention, it is to be appreciated that m is equal to 3, such that there are $2^3$ possible symbols that define all of the possible consecutive three bit combinations of input data bits that may occur with respect to an NRZ input data bit stream. Also, in accordance with m being equal to 3, a symbol is defined by three consecutive data bits in the form $(B_{-2}, B_{-1}, B_0)$, where $B_0$ is the current data bit, $B_{-1}$ is the data bit prior to $B_0$ and $B_{-2}$ is the data bit prior to $B_{-1}$. It is to be appreciated that, as will be explained in detail later, m is equal to 3 in the above-described embodiment due to the fact that the preferred embodiment assumes a Gaussian filter having a 3dB bandwidth ($BT_B$) of 0.5, which causes a data bit, as will be explained, to spread over three consecutive data bit periods. Therefore, it is to be appreciated that each phase advance associated with a symbol is substantially equivalent to a percent phase advance contributed by the three consecutive data bits associated with that symbol.

Furthermore, a preferred method of the present invention provides for generating both an in-phase GMSK modulating signal and a quadrature GMSK modulating signal in the same manner as mentioned above and which will be described in greater detail later. In accordance with GMSK modulation techniques, the in-phase and quadrature GMSK modulating signals will be either a sinusoidally or cosinusoidally varying signal.

In accordance with one form of apparatus for generating at least one GMSK modulating signal from a serial digital data bit stream in order that the at least one GMSK modulating signal may modulate a carrier frequency signal associated with a GMSK transmitter of a digital communication system, such apparatus includes a serial-to-parallel (S/P) conversion circuit. The S/P conversion circuit is responsive to the serial digital data bit stream and converts each set of m consecutive data bits of the serial digital data bit stream into a parallel symbol, whereby there are $2^m$ possible symbols, each symbol being generally defined as $(B_{-(m-1)}, \ldots B_0)$. Similarly, as with respect to the above-described method of the present invention, $B_0$ is the current data bit and $B_{-(m-1)}$ is the mth previous data bit with respect to $B_0$.

The apparatus of the present invention also includes a phase calculation circuit which is operatively coupled to the S/P conversion circuit. Specifically, the phase calculation circuit stores both the corresponding phase advances and the at least four corresponding accumulated phases associated with each of the $2^m$ symbols. Further, the present invention includes a waveform memory circuit which is operatively coupled to the S/P conversion circuit and the phase calculation circuit. Specifically, the waveform memory circuit stores the plurality of digitally represented waveform portions which, as mentioned above and as will be explained in greater detail later, will form the in-phase and quadrature GMSK modulating signals.

Preferably, the apparatus of the present invention also includes a digital-to-analog (D/A) conversion circuit which is operatively coupled to the waveform memory circuit. The D/A conversion circuits converts each digitally represented waveform portion, which is output from the waveform memory circuit, to an analog representation thereof in order to form a corresponding analog representation of the at least one GMSK modulating signal. Also, the apparatus of the present invention preferably includes a filtering circuit which is operatively coupled to the D/A conversion circuit and which filters the at least one GMSK modulating signal. Still further, a mixing circuit may preferably be provided and operatively coupled to the filtering circuit for mixing the at least one GMSK modulating signal with the carrier frequency signal to form at least one GMSK modulated output signal.

A sampling time control circuit may also preferably be included in a preferred embodiment of the apparatus of the present invention. Specifically, the sampling time control circuit is operatively coupled to the waveform memory circuit such that the waveform memory circuit outputs (reads out) each digitally represented waveform portion, corresponding to each data bit, one sample at a time according to a predetermined sampling rate associated with the sampling time control circuit. The sampling rate is preferably equivalent to a fraction of a bit period associated with each data bit. Reading out the waveform portions a sample at a time is to be distinguished from the "sample by sample" processing approach of the prior art which actually calculates and then generates each portion on a sample by sample basis.

As discussed above, and as will be explained in greater detail later, the S/P conversion circuit may preferably set m equal to 3 such that there are $2^3$ possible symbols that define the possible consecutive three bit combinations of input data bits that may occur as part of the NRZ input data bit stream.

Previously, as described above, methods and apparatus for generating GMSK modulating signals have included doing so on a sample by sample basis. Specifically, each modulating signal is formed by calculating and generating an individual portion of the signal waveform for each sample period, such that the waveform portion associated with a bit period is formed by combining the individual waveform portions calculated and generated in each sample. Disadvantageously, the conventional approach requires that the same processing steps must be repeated within a bit period for each sample used in order to form a modulating signal.

However, in accordance with the present invention, individual portions of the GMSK modulating waveform are generated on a bit by bit basis through the utilization of the phase advance relationships associated with consecutive data bits. Accordingly, in a GMSK modulator which employs a DSP (digital signal processor) and ROM devices to perform modulation functions, it is to be appreciated that computational cycles associated with the DSP and the memory size associated with the ROM devices should be advantageously minimized in order to increase communications system performance. Thus, due to the fact that the present invention generates the in-phase and quadrature GMSK modulating signals in the more efficient, bit by bit manner, as compared to the conventional sample by sample manner, a GMSK modulator formed in accordance with the present invention realizes significant improvement in operational efficiency and significant decrease in component complexity.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 4 is an accumulated phase trellis diagram associated with a bit by bit ROM-based GMSK modulator formed in accordance with the present invention.

FIG. 5A is an exemplary NRZ input data bit sequence.

FIG. 5B is a graphical plot of each individual data bit shown in FIG. 5A after having passed through a Gaussian filter with a $BT_B$ of 0.5.

DETAILED DESCRIPTION OF THE PREFERRED EMBODIMENTS

Figure 2:
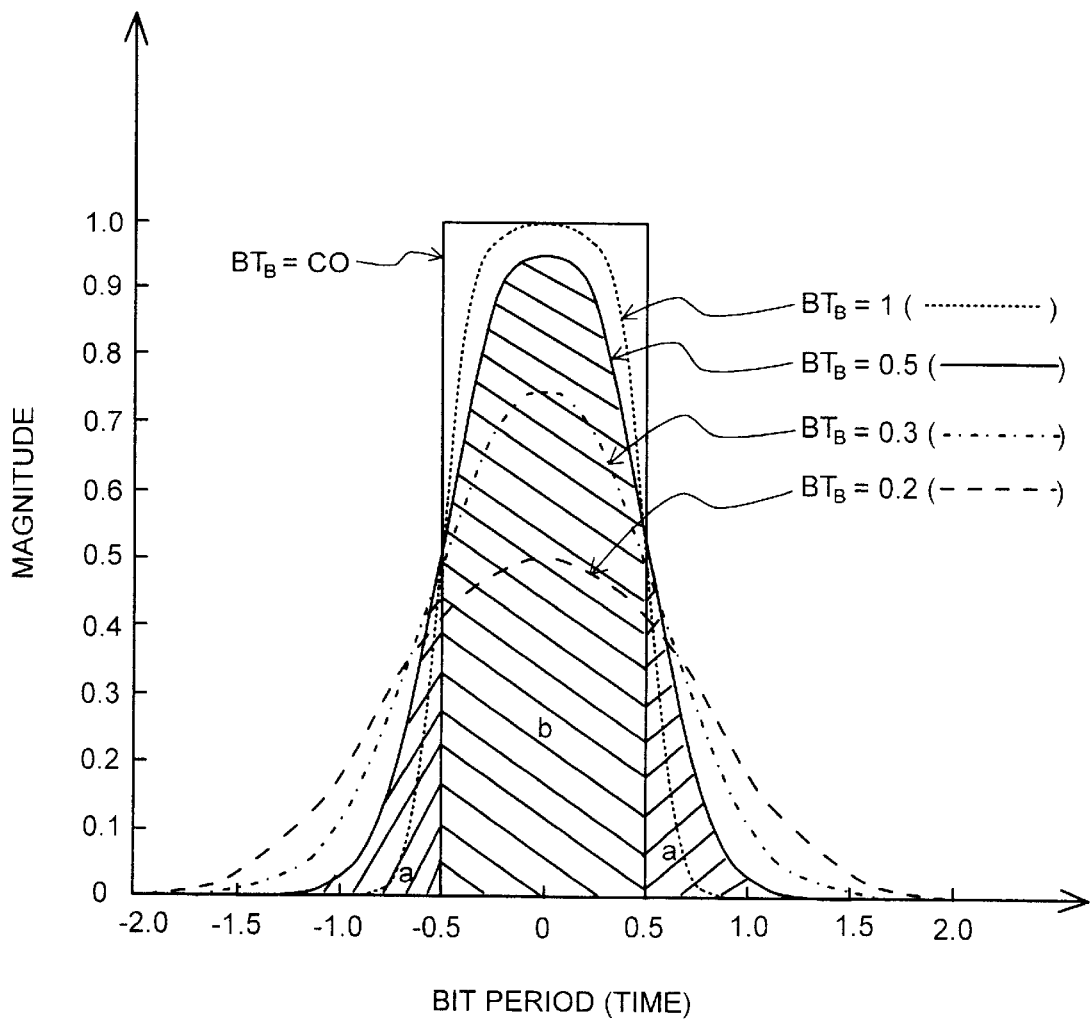
FIG. 2 is a pulse response plot for various Gaussian filters having various 3dB bandwidths associated therewith.

The method and apparatus of the present invention for performing GMSK modulation in a bit by bit, ROM-based manner achieves its improved performance efficiency over prior art techniques for performing GMSK modulation, in part, through the utilization of the phase advance relationships that exist between consecutive data bits received as part of an NRZ input data bit stream. This is to be distinguished from the conventional sample by sample approach previously discussed whereby every sample taken during each bit period is processed to generate an individual portion of the GMSK modulating waveform (i.e., signal that modulates the RF carrier signal). In the present invention, individual portions of the GMSK modulating waveform are generated on a bit by bit basis through the utilization of the phase advance relationships associated with consecutive data bits. An understanding of the basis for these phase relationships which the present invention employs may initially be realized through the graph illustrated in FIG. 2. Specifically, the graph in FIG. 2 is a pulse response plot of the absolute value of the magnitude of an input data bit versus bit period (time) for various Gaussian filters. Among other characteristics, it is to be appreciated that a Gaussian filter may be characterized by the 3dB bandwidth associated therewith. The 3dB bandwidth of a Gaussian filter may be represented by the term $BT_B$, where $T_b$ is the period of a data bit.

As previously mentioned, GMSK modulation is structurally similar to MSK modulation with the exception of the addition of a Gaussian filter, which is placed at the input of the MSK modulator. The primary reason for placing the Gaussian filter at the input of the MSK modulator is to smooth the abrupt transitions between +1 and −1 data bits of the NRZ input data bit stream. It is known that modulators that experience such abrupt transitions yield a wider output power spectral density curve than modulators that do not experience such abrupt data bit transitions. Wider output power spectral density requires larger channel bandwidth, an effect that is undesirable for communications systems operating in limited bandwidth environments. However, the smoothing effect of the Gaussian filter, as can be seen in FIG. 2, causes the data bit to be spread over the time periods of successive bits. The time duration over which a data bit is spread due to the smoothing effect is known as the spread period. In fact, as shown in FIG. 2, the smaller the 3dB bandwidth associated with the Gaussian filter, the greater the spread period associated with any one data bit. For example, the graph of FIG. 2 shows that a 3dB bandwidth ($BT_B$) of 0.5 causes a data bit, and therefore its effect, to be spread over three bit periods, e.g., −1.5 to 1.5. On the other hand, as $BT_B$ theoretically reaches infinity, any one data bit is contained within a single bit period, e.g., −0.5 to 0.5. It is to be understood that a Gaussian filter with a theoretical $BT_B$ of infinity has no smoothing effect at all and, therefore, the plot illustrating such 3dB bandwidth in FIG. 2 merely represents MSK modulation, i.e., a modulation technique without a pre-modulation Gaussian filtering stage, whereby data bits may abruptly transition between +1 and −1.

Before explaining how the present invention implements its unique method and apparatus for generating a GMSK modulating waveform from an NRZ input data bit stream in order to perform GMSK modulation, certain aspects of the related MSK modulation technique should be appreciated. As previously mentioned, MSK modulation may be described from the point of view of continuous phase FSK modulation. Therefore, with respect to MSK modulation, it is to be appreciated that an RF carrier signal will be respectively modulated such that the carrier frequency, $f_C$, associated with the RF carrier signal will be shifted to a first frequency, $f_1$, to represent the transmission of a −1 data bit and to a second frequency, $f_2$, to represent the transmission of a +1 data bit. Also as previously mentioned, MSK modulation exhibits a property whereby the frequency deviation, $f_2-f_1$, between the two signaling frequencies is equal to one half of the bit rate associated with the NRZ input data bit stream, i.e., 1/2T.

Particularly with respect to MSK modulation, this means that, assuming the phase of the carrier signal advances 360 degrees in one bit period when not being modulated (i.e., the NRZ signal is neither +1 or −1, but rather is at zero), then it is also known that the phase deviation (i.e., integral of the frequency deviation) associated with the modulated carrier signal will be 180 degrees (i.e., one half of 360). Thus, in MSK modulation, the phase of the carrier signal will change by +90 degrees when modulated by an MSK modulating signal corresponding to a +1 data bit so that the total phase advance of the MSK modulated output signal (i.e., signal output by the modulator) over a bit period will be 450 degrees (360 degrees +90 degrees). Alternatively, the phase of the carrier signal will change by −90 degrees when modulated by an MSK modulating signal corresponding to a −1 data bit so that the total phase advance of the MSK modulated output signal over a bit period will be 270 degrees (360 degree −90 degrees).

However, GMSK and MSK modulation differ in that, for MSK modulation, the phase advances equally (positively for +1 data bit and negatively for −1 data bit) for every sample taken over every bit period, while for GMSK modulation, this is not necessarily the case due to the influence of the preceding data bits on the current data bit caused by the smoothing effect of the Gaussian filter. Thus, while the phase of an MSK modulating signal will advance by +90 degrees for a +1 data bit and by −90 degrees for a −1 data bit, the phase associated with a GMSK modulating signal will not necessarily do the same over each bit period.

Figure 3:
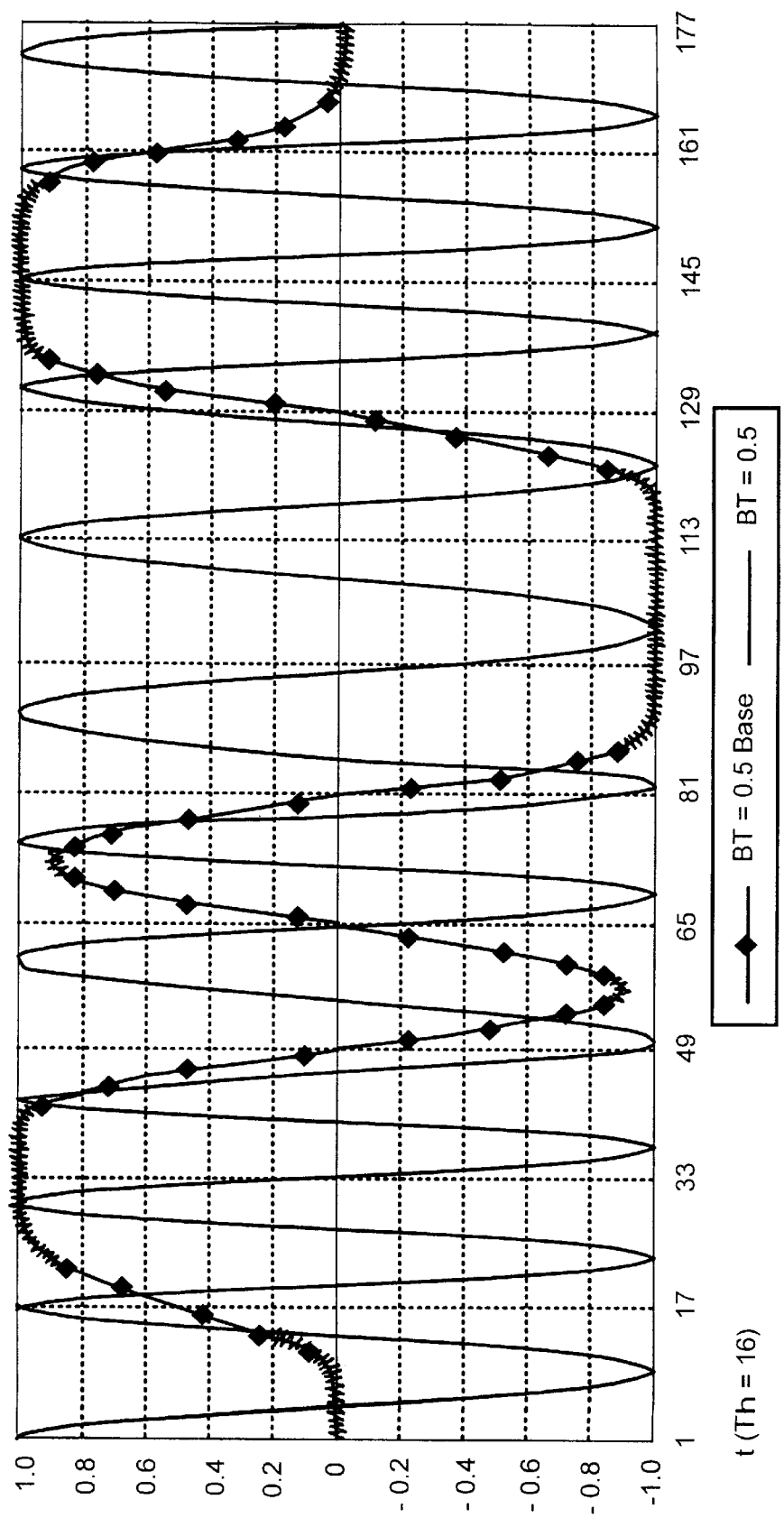
FIG. 3 is a graphical representation of an output signal associated with a Gaussian low pass filter in response to a particular NRZ input data bit stream and a graphical representation of an output signal associated with a GMSK modulator.

Referring now to FIG. 3, the smoothing effect of a Gaussian filter and the corresponding results of the phase advance associated with a GMSK modulated output signal are illustrated. Specifically, a graphical plot of a Gaussian filter output signal from a Gaussian low pass filter having a 3dB bandwidth ($BT_B$) of 0.5 for a particular NRZ input data bit sequence, and a graphical plot of the corresponding GMSK modulated output signal, are shown. The particular NRZ input data bit sequence, as indicated, is arbitrarily chosen for illustrative purposes to be +1, +1, −1, +1, −1, −1, −1, +1, +1. The Gaussian filter output signal is denoted as the plot with diamond-shaped characters marked thereon, while the GMSK modulated output signal is the plot without characters marked thereon. A sampling rate of 16, i.e., 16 samples per bit period, is also arbitrarily chosen in order to illustrate the two exemplary signals.

As is known, the NRZ data bit stream (similar to the one illustrated in, and discussed in relation to, FIG. 5A) is presented to the input of a Gaussian filter which, in response, produces a composite signal which, by way of example, is represented in FIG. 3. The smoothing effect of the Gaussian filter may be seen through the gradual and rounded transitions between +1 and −1. Also, the spreading effect of the Gaussian filter may be seen wherein preceding data bits have an effect on the current data bit. This is the reason that the plot of the Gaussian filter output signal does not immediately jump up to +1 or down to −1 in response to the current input data bit, or for that matter, does not always fully reach an amplitude of +1 or −1 during its transitional excursions.

Referring now to the plot of the GMSK modulated output signal shown in FIG. 3. it can be seen that, unlike for MSK modulation where the total phase advance corresponding to a +1 data bit over one bit period is 450 degrees (360 degrees +90 degrees) and to a -I data bit over one bit period is 270 degrees (360 degrees −90 degrees), the total phase advance corresponding to each data bit may be something different. For example, the total phase advance that occurs over the ninth bit period, defined between t=97 and t=113, in which a +1 occurs in the NRZ input data bit sequence is not exactly 450 degrees.

Figure 6:
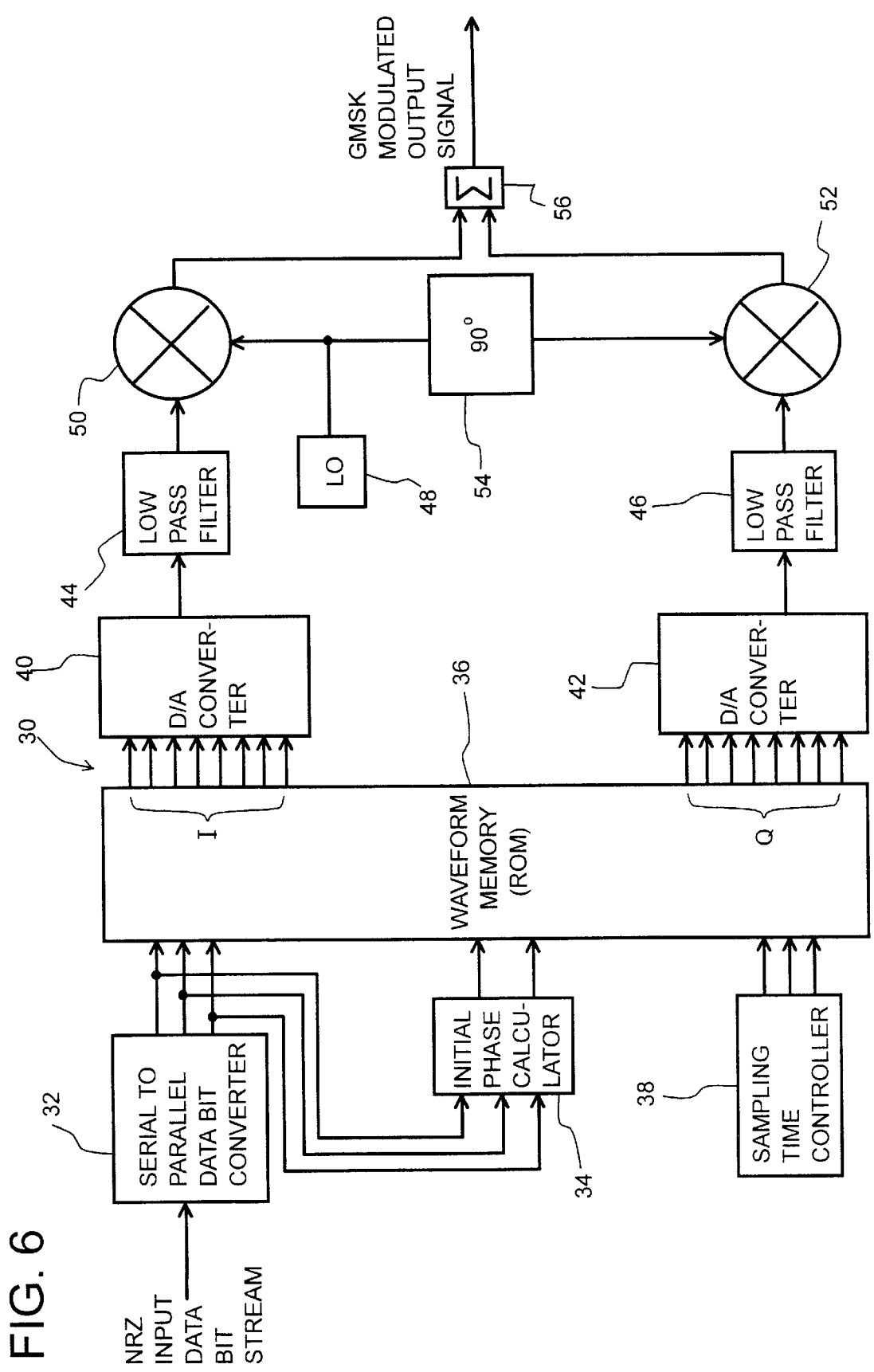
FIG. 6 is a functional block diagram of a bit by bit ROM-based GMSK modulator formed in accordance with the present invention.

Advantageously, the present invention provides a method and apparatus for performing GMSK modulation by uniquely developing and utilizing the phase advance relationships that are associated with consecutive data bits of an NRZ signal subjected to the spreading effect of a Gaussian filter. FIG. 6 is a functional schematic diagram of a GMSK modulator formed in accordance with the present invention. The particular operation and several preferred implementations (including hardware and software embodiments) will be described in detail in the context of FIG. 6 after the development of phase advance relationships, employed by the present invention, is explained. It should be appreciated that in a preferred embodiment, the GMSK modulation technique of the present invention assumes a Gaussian filter having a $BT_B$ of 0.5 and, thus, the following description of the present invention will be explained from the perspective of this assumption. Therefore, according to the Gaussian filter pulse response for a square (i.e, rectangular) pulse illustrated in FIG. 1 for a $BT_B$ of 0.5, it is known that the significant spread period of an input bit is substantially equal to $3 \times T_b$. Thus, in accordance with the present invention, a symbol is advantageously defined as the current input data bit plus the previous two data bits (i.e., three bits). Significantly, it is to be appreciated that, in accordance with the modulation technique described herein, the phase advance at the end of the current data bit period is only a function of the phase advances associated with that particular symbol. Another way to view such a relationship is by realizing that in any one bit period, the current bit and the previous two bits will effect the phase advance accumulated at the end of the current data bit. Thus, by knowing the phase advance at the end of each bit period, the accumulated phase may be tracked at the end of each bit period and be carried over to the next bit period to determine the accumulated phase at the end of that bit period and, consequently, at the end of a particular symbol.

The basis for this phase relationship may be appreciated by referring again to FIG. 2. In FIG. 2, it may be seen that the plot representing the Gaussian pulse response for a Gaussian filter with a $BT_B$ of 0.5 depicts a cross-hatched region within the time interval −0.5 to 0.5 and which is denoted as "b". Likewise, the same plot defines two other cross-hatched regions of substantially identical area respectively within the two time intervals −1.5 to −0.5 and 0.5 to 1.5, which are each denoted as "a". As previously mentioned in the discussion regarding MSK and GMSK modulation techniques, it can be stated that, but for the Gaussian filter, the phase of the modulation output signal would advance by +or −90 degrees within a bit period. However, due to the spreading effect of the Gaussian filter, the +or −90 degree phase advance is spread over three bit periods (for $BT_B$ of 0.5), as is illustrated in FIG. 2. Thus, due to the shape of the Gaussian response, it is to be appreciated that the area under the curve within each of the three time intervals (bit periods) directly corresponds to the percentage of the 90 degree phase advance (plus or minus depending on the sign of the data bit) that will occur over each of the three time intervals.

From the plot in FIG. 2, it may be found that the area of the region denoted as "b" is approximately 0.78, while the respective areas of the regions denoted as "a" are approximately 0.105. Therefore, it is to be appreciated that for an isolated data bit (not affected by previous data bits) which is spread over three bit periods, the phase will advance approximately 9.5 degrees (0.105×90 degrees) in the first bit period, approximately 71 degrees (0.78×90 degrees) in the second bit period and approximately 9.5 degrees (0.105×90 degrees) in the third bit period. However, since the NRZ input data bit stream is typically presenting consecutive data bits over consecutive bit periods, the phase of any one bit period will be influenced by the percent phase advance of the current bit plus the percent phase advance of the previous two data bits. In other words, in any given bit period, the phase advance may have three contributing factors, e.g., the percent phase advance from the current bit and the percent phase advances from each of the two previous data bits.

It is to be appreciated that defining a symbol to be equivalent to three bits is sufficient because approximately 99 percent of the signal energy output by a GMSK modulator with a Gaussian filter having a 3dB bandwidth, $BT_B$, equal to 0.5 is contained within a period equivalent to three bits. This is substantially due to the fact that a Gaussian low pass filter having a $BT_B$ equal to 0.5 has, in effect, an operational "memory" capacity of only three bits. Therefore, processing of a fourth bit in a system employing a Gaussian filter having a $BT_B$ of 0.5 will have only a minimal effect on the output power spectrum and, thus, for the purposes of the preferred embodiment of the present invention, it can be assumed that all of the response of the Gaussian low pass filter is within three bits. However, it is to be understood that if a Gaussian low pass filter with a $BT_B$ of 0.3 were employed, the present invention may define a symbol equal to four bits, and so on for various other types of Gaussian filters having certain 3dB bandwidths associated therewith. While the additional bit or bits would introduce more phase advance possibilities, which will be discussed in detail below, it is to be appreciated that all such phase advances would still be known and, therefore, would be accounted for in generating the GMSK modulated output signal in accordance with the operation of the present invention.

Therefore, given the fact that the NRZ input data bit stream provides either a +1 data bit or a −1 data bit and, in a preferred embodiment of the present invention, a symbol is defined by the current bit, $B_0$, and the previous two bits, $B_{-1}$ and $B_{-2}$, respectively, it is to be appreciated that there are only eight ($2^3$) possible types of symbols that may occur. Each symbol may be represented as $B_{-2} B_{-1} B_0$ and the eight possible symbols may be defined as: +1, +1, +1; +1, +1, −1; +1, −1, +1; +1, −1, −1; −1, +1, +1; −1, +1, −1; −1, −1, +1; −1, −1, −1. It should be understood that binary values "0" and "1" are assigned to the +1 and −1 data bits in performing GMSK modulation in accordance with the present invention. While, for purposes of the following discussion and the accompanying Figures, the present invention preferably assigns a "0" to a +1 data bit and a "1" to a −1 data bit, it is to be understood that it is within the scope of the present invention to have the binary value "0" correspond to a −1 input data bit and have the binary value "1" correspond to a +1 input data bit.

Since, as previously explained, the phase advance associated with the current bit is equivalent to the phase advance accumulated from the previous two bits and the current bit, and since there are only 8 possible kinds of three bit combinations (i.e., 8 types of symbols), therefore, the present invention teaches that each symbol may be characterized as having a single phase advance associated therewith. Referring to Table I below, the phase advances associated with each of the 8 possible symbols are listed therein in the second column labeled "Phase Advance".

TABLE I

| Symbol ($B_{-2} B_{-1} B_0$) | Phase Advance | Final Accumulated Phase | Initial Accumulated Phase |
|---|---|---|---|
| 0 0 0 | 1 | n | n |
| 0 0 1 | b | b+n | n |
| 0 1 0 | −b+2a | −b+n | b+n |
| 0 1 1 | −b | n | b+n |
| 1 0 0 | b | n | −b+n |
| 1 0 1 | b−2a | b+n | −b+n |
| 1 1 0 | −b | −b+n | n |
| 1 1 1 | −1 | n | n |

Regarding the second column in Table I and as illustrated and explained with respect to FIG. 2, "a" represents, approximately, a 9.5 degree phase advance (with "2a" representing a 19 degree phase advance), "b" represents, approximately, a 71 degree phase advance and "1" represents, approximately, a 90 degree phase advance. By way of example, for the current bit period where the current data bit, $B_0$, is a −1 ("1") and the previous data bit, $B_{-1}$, is a +1 ("0"), and the previous bit before that bit, $B_{-2}$, is a −1 ("1"), i.e., symbol 101, the phase advance associated with the current bit period is b−2a, or 71 −2(9.5), which is equivalent to 52 degrees.

Through the realization that the phase advance associated with a GMSK modulating waveform for a current bit period, formed in accordance with the present invention, is a function of the phase advance associated with the current bit period and the phase advance of the two preceding bit periods (i.e., the symbol only), the present invention provides that each symbol will also have one final accumulated phase and one initial accumulated phase associated therewith. The final accumulated phase is the phase advance that accumulates by the end of the last bit period of a given symbol regardless of what sequence of data bits from the NRZ input data bit stream preceded that particular symbol. The initial accumulated phase is the phase advance of the symbol that accumulates just prior to the symbol of interest. It is to be appreciated that the initial accumulated phase advance can be known due to the fact that there are only two types of symbols that could have preceded the current symbol, e.g., prior to the symbol 010, the symbol would have to have been either 101 or 001. The final accumulated phase advance for each symbol is listed in Table I, column three, labeled "Final Accumulated Phase" and the initial accumulated phase advance for each symbol is listed in Table I, column four, labeled "Initial Accumulated Phase". It is to be understood that the "b" in the third and fourth columns of Table I also represents approximately 71 degrees and the "n", as will be explained below, represents an integer equal to either 1, 2, 3, or 4. Integer "n" being 1, 2, 3, or 4 respectively corresponds to 90 degrees (1×90 degrees), 180 degrees (2×90 degrees), 270 degrees (3×90 degrees), or 360 (i.e., 0) degrees (4×90 degrees). As will be explained, these four multiples of 90 degrees, which are referred to hereinafter as "initial phases", will serve as a basis to account for, and thus derive, all possible phase advances that may occur in the GMSK modulating signal, formed in accordance with the present invention, for each of the 8 possible symbols. Accordingly, the present invention provides that since there are preferably only 8 possible symbols and preferably only 4 possible initial phases (due to there being four values for integer "n"), then significantly, a GMSK modulating waveform may be constructed by choosing for any bit period, from one of 32 (8×4) possible waveform portions which, as will be explained in the context of FIG. 6, may be stored in a waveform memory. The combination of these individual waveform portions will form the GMSK modulating signal.

Referring now to FIGS. 4, 5A and 5B, an explanation by way of example of how the results in Table I are derived, in accordance with the present invention, will now be given. FIG. 4 is an accumulated phase trellis diagram, while FIG. 5A is a plot of an exemplary NRZ input data bit sequence. FIG. 5B is a plot of each individual input data bit of FIG. 5A, after having passed through the Gaussian filter, individually imposed on the graph in order to illustrate how each data bit within a symbol effects the phase advance and accumulated phase associated with each symbol.

Referring initially to FIG. 5A, an exemplary NRZ input data bit sequence is shown whereby, as previously explained, a binary value of "1" is assigned to a −1 data bit and a binary value of "0" is assigned to a +1 data bit for each bit period, 1T, 2T, 3T and so on. FIG. 5B is aligned with FIG. 5A for each bit period so that the corresponding spreading effect caused by the Gaussian filter may be illustrated for each data bit. It should be understood that each "spread" data bit in FIG. 5B is similar to the data bit illustrated and explained in the context of FIG. 2, therefore, each spread data bit has the same "a" (9.5 degree phase advance) and "b" (71 degree phase advance) regions that are shown in FIG. 2. For the purpose of clarity, these regions have been shaded and labeled in FIG. 5B for the first data bit only. Thus, it can be seen that while a +1 data bit occurs in the first bit period (0 to 1T) in FIG. 5A, the Gaussian effect causes the bit to contribute a percent phase advance in FIG. 5B of only 9.5 degrees in the first bit period (0 to 1T), 71 degrees in the second bit period (1T to 2T) and 9.5 degrees in the third bit period (2T to 3T).

Furthermore, it can be seen that within the third bit period (2T to 3T), the first data bit (+1) contributes an "a" region to the phase advance, the second data bit (+1) contributes a "b" region to the phase advance and the third data bit (+1) contributes an "a" region to the phase advance. Thus, employing a sign convention wherein a +1 data bit ("0" binary value) is a positive contribution and a −1 data bit ("1" binary value) is a negative contribution, it can be stated that the phase advance associated with the third bit period and, therefore, a symbol of 000, is equal to b+a+a or b+2a. In terms of phase, this means that the phase advance is equal to 90 degrees (71+(2×9.5)). Referring to column two of Table I, it is to be understood that the phase advance for the symbol 000 is listed as 1 rather than b+2a since they both are equivalent to 90 degrees. As another example of how the phase advance listed in column two of Table I is derived, the eighth, ninth and tenth data bits in FIG. 5A represent a symbol of 101. Thus, the phase advance associated with that symbol can be determined by looking at the phase contributions made by each bit within the tenth bit period (9T to 10T). The eighth data bit contributes an "a" region, the ninth data bit contributes a "b" region and the tenth data bit contributes an "a" region such that the phase advance for symbol 101, employing the above-mentioned sign convention, is equal to b−2a or 52 degrees.

Referring to FIG. 4, an accumulated phase trellis diagram is presented to illustrate the derivation of the final and initial accumulated phase associated with each of the 8 possible symbols. As previously mentioned, the final accumulated phase is the phase advance that accumulates by the end of the last bit period of a given symbol regardless of what sequence of data bits, i.e., symbols, from the NRZ input data bit stream preceded that particular symbol. Therefore, to illustrate such a feature, the diagram in FIG. 4 tracks (accumulates) the individual phase advances associated with each symbol as the data bits progress through the particular NRZ input data bit sequence. Thus, starting at symbol 000, if the next bit is −1 (binary value "1") then the current symbol is now symbol 001 which is known to have a phase advance of b (see Table I and/or FIGS. 5A and 5B). Since this is the starting point of reference, the current (final) accumulated phase is b−0 or b. If the next bit is +1 (binary value "0"). then the current symbol becomes 010 which is known to have a phase advance of −b+2a. In order to determine the current accumulated phase, the current phase advance is added to the previous accumulated phase. Therefore, −b+2a (current phase advance) is added to b (previous accumulated phase) to get 2a (current accumulated phase). If the next bit is −1 (binary value "1"), then the current symbol is now 101 which is known to have a phase advance of b−2a. Following the above formula, the current accumulated phase is b (i.e., b−2a+2a). If the next bit is +1 (binary value "0"), then the current symbol is now 010 which is known to have a phase advance of −b+2a. Again, following the above formula, the current accumulated phase is 2a (i.e., b+(−b+2a)). Referring to column three of Table I, each final (current) accumulated phase associated with the current symbol is listed therein. For instance, the final accumulated phase for symbol 010 is −b+n, which as will be explained below, is equivalent to 2a+n.

As previously mentioned, the integer "n" may be either 1, 2, 3, or 4 whereby integer 1 is equivalent to 90 degrees, integer 2 to 180 degrees, integer 3 to 270 degrees and integer 4 to 0 degrees (same as 360 degrees). Thus, it is to be appreciated that, in accordance with the present invention, the final accumulated phase for symbol 010, −b+n, can be only one of four possibilities, i.e., 19 degrees (−b+90), 109 degrees (−b+180), 199 degrees (−b+270) or 289 degrees (−b+360), where −b is equal to −71 degrees. However, it should be understood that the same four possible final accumulated phases for symbol 010 would result if the final accumulated phase were represented as 2a+n. Nonetheless, for purposes of consistency, the final accumulated phases are listed in column three of Table I in terms of "b" and "n" only.

Accordingly, it is to be appreciated that each of the final accumulated phases associated with each of the 8 possible symbols can be derived in a similar manner. Table II lists the four possible final accumulated phases for each of the 8 possible symbols as derived from column three of Table I for the four values of integer n. Furthermore, it is to be understood that each initial accumulated phase listed in column four of Table I, which is the phase advance that accumulates just prior to the symbol of interest (i.e., the accumulated phase of the symbol that preceded the accumulated phase of the current symbol), may be calculated in a similar manner.

TABLE II

| Symbol ($B_{-2}$ $B_{-1}$ $B_0$) | Final Accumulated Phase |
|---|---|
| 0 0 0 | 0, 90, 180, 270 |
| 0 0 1 | 71, 161, 251, 341 |
| 0 1 0 | 19, 109, 199, 289 |
| 0 1 1 | 0, 90, 180, 270 |
| 1 0 0 | 0, 90, 180, 270 |
| 1 0 1 | 71, 161, 251, 341 |
| 1 1 0 | 19, 109, 199, 289 |
| 1 1 1 | 0, 90, 180, 270 |

Thus, it is to be appreciated that through the utilization of the phase relationships associated with three consecutive data bits, as described above in accordance with the present invention, a substantial advantage over existing GMSK modulators is realized. For instance, it is to be understood that in the conventional GMSK modulator previously discussed, the GMSK modulating waveform is constructed on a sample by sample basis whereby every sample taken during every bit period is processed to generate the corresponding portion of the modulating waveform. In contrast, by knowing the phase advance that is associated with each consecutive three data bit sequence and by tracking the accumulated phase advance therefrom, the present invention is able to generate a GMSK modulating waveform on a bit by bit basis, that is, each portion of the modulating waveform may be generated by merely knowing the current three data bits and which of the four values of integer "n" is required to get one of the four possible final accumulated phases (Table II) associated with each symbol. Thus, a substantial savings in the amount of processing time, as well as a substantial savings in system components as will be explained below, may be realized by the present invention.

Referring now to FIG. 6, a functional schematic diagram of a GMSK modulator 30, formed in accordance with the present invention, is illustrated. Specifically, a serial-to-parallel (S/P) converter 32 having one input port and three output ports is operatively coupled to an NRZ input data bit stream source at the input port of the S/P converter 32. An initial phase calculator 34 having three input ports and two output ports is operatively coupled to the output ports of the S/P converter 32. A waveform memory 36 having eight input ports and sixteen output ports (eight in-phase (I) output ports and eight quadrature (Q) output ports) is operatively coupled to the output ports of the S/P converter 32 and the initial phase calculator 34. A sampling time controller 38 having three output ports is also operatively coupled to three corresponding input ports of the waveform memory 36. Further, a first digital-to-analog (D/A) converter 40 having eight input ports and one output port is operatively coupled to the I output ports of the waveform memory 36, while a second digital-to-analog (D/A) converter 42 having eight input ports and one output port is operatively coupled to the Q output ports of the waveform memory 36. Still further, first and second low pass filters, 44 and 46, each having an input port and an output port, are respectively operatively coupled to the output ports of the first and second D/A converters, 40 and 42.

Next, an in-phase mixer 50 having first and second input ports and one output port is operatively coupled to the output port of filter 44 at the first input port of mixer 50. Similarly, a quadrature mixer 52 having first and second input ports and one output port is operatively coupled to the output port of filter 46 at the first input port of mixer 52. Further, a local oscillator 48 having an output port is operatively coupled to the second input port of in-phase mixer 50 and to a 90 degree phase shifter 54, having an input port and an output port, at the input port of the phase shifter 54. The output port of the phase shifter 54 is operatively coupled to the second input port of the quadrature mixer 52. Lastly, a summer 56 having first and second input ports and an output port is respectively operatively coupled to the output ports of the in-phase and quadrature mixers, 50 and 52. It is to be appreciated that the output port of the summer 56 may be operatively coupled to a next stage of a GMSK transmitter, e.g( an amplifier circuit (not shown) or directly to an antenna (not shown) for transmission. Given the above-described connectivity of the individual components, the operation of the present invention in the context of FIG. 6 will now be described.

Initially, an NRZ input data bit stream is presented to the input port of the S/P converter 32. The NRZ input data bit stream may be similar to the sequence shown in FIG. 5A or any sequence of data bits which represent the digital data (information) to be processed by the GMSK modulator of the present invention. The S/P converter 32 converts the serial bit stream into a parallel word format. As previously mentioned in the preferred embodiment of the present invention, since the spread period of a Gaussian filter having a $BT_B$ of 0.5 is equivalent to three bit periods, the S/P converter 32 generates a parallel word format of three data bits, which includes the current data bit, $B_0$, and the two previous data bits, $B_{-1}$ and $B_{-2}$, thus, forming a symbol ($B_{-2}$, $B_{-1}$, $B_0$). It is to be understood that the parallel word generated by the S/P converter 32 represents a symbol of which, as discussed above, there may be 8 possibilities. The current symbol is presented to the initial phase calculator 34 which, in response thereto, generates one of the four previously described initial phases (i.e., integer value of "n" equal to 1, 2, 3, or 4 respectively corresponding to 90, 180, 270 or 0 (360) degrees) associated with that particular symbol. Each of the four integer values are assigned a two-bit binary value such that binary values "01", "10", "11" and "00" respectively represent n equal to 1, 2, 3 and 4. The symbol ($B_{-2}$, $B_{-1}$, $B_0$) is a binary parallel word and will be referred to as a parallel symbol. In operation, an NRZ input data bit stream is input into the serial to parallel data bit converter 32 in binary form having three digits (e.g., 100, 101 ). The three digits are then output onto separate lines from the converter to form a parallel binary number (i.e., for the serial binary number 101, the first digit is output as $B_{-2}$ on a first output port of converter 32, the second digit is output as $B_{-1}$ on a second output port of converter 32, and the third digit is output as $B_0$ on a third output port of converter 32). The original serial binary number can now be input in parallel form to the waveform memory 36 and initial phase calculator 34.

The current symbol (3 bits) and the particular initial phase (2 bits) are presented to the waveform memory 36. It is to be appreciated that, stored in the waveform memory 36, are all possible individual waveform portions which will make up an in-phase GMSK modulating waveform and a quadrature GMSK modulating waveform. It is also to be understood that the in-phase GMSK modulating waveform is constructed as a cosine waveform, while the quadrature GMSK modulating waveform is constructed as a sine waveform. However, it is to be understood that opposite correspondence may be employed. Each waveform portion, thus, respectively represents a time varying waveform that advances in phase by an amount respectively equivalent to each one of the four accumulated phases associated with each symbol. In accordance with the present invention, since there are only 8 possible symbols and 4 possible initial phases, there advantageously need be only 32 (8×4) individual waveform portions stored in the waveform memory 36 in order to construct each of the in-phase (cosine) and quadrature (sine) modulating waveforms. Furthermore, it should be understood that, since a cosine waveform and a sine waveform differ by 90 degrees, the individual waveform portions of the sine waveform may be generated directly from the individual waveform portions of the cosine waveform by simply adding 90 degrees, or visa versa, by subtracting 90 degrees. However, in an alternative embodiment, the present invention contemplates storing 64 individual waveform portions (32 for the cosine waveform and 32 for the sine waveform) in the waveform memory 36. Nonetheless, for each bit period, based on the current symbol and the particular initial phase associated therewith, the waveform memory 36 will output (read out) the appropriate waveform portion for each of the in-phase and quadrature GMSK modulating waveforms.

It is to be understood that in MSK modulation, as opposed to GMSK modulation, the in-phase MSK modulating signal corresponds to the even numbered input data bits of the NRZ input data bit stream and the quadrature MSK modulating signal corresponds to the odd numbered input data bits of the NRZ input data bit stream. Therefore, only two consecutive data bits (odd numbered data bits and even numbered data bits) are compared to determine in-phase and quadrature phase components of the MSK modulating signals. However, in GMSK modulation, where the Gaussian filter with a $BT_B$ of 0.5 causes a spreading effect over three bit periods, modulation requires taking into account the current bit and the two previous bits in order to form the in-phase and quadrature modulating signals. Accordingly, the in-phase (cosine) and quadrature (sine) GMSK modulating signals, formed according to the present invention, account for this overlapping of effect between three consecutive data bits.

In a preferred embodiment, the in-phase modulating waveform is represented by 8 bits (i.e., eight I output ports of waveform memory 36) and the quadrature modulating waveform is also represented by 8 bits (i.e., eight Q output ports of waveform memory 36). Furthermore, in addition to the 8 bit resolution provided for each modulating waveform, a sampling time controller 38 controls the frequency of samples to be used to represent an individual waveform portion. For instance, if an eight times (8×) sampling rate is used (FIG. 6), then three timing bits are required and provided to the waveform memory 36. Accordingly, in addition to having an 8-bit output resolution, each individual waveform portion may be formed from 8 individual samples, each corresponding to one-eighth of a bit period. It is to be understood that, while FIG. 6 illustrates an 8-bit output resolution and an 8× sampling rate, greater and lesser resolutions and greater and lesser sampling rates are within the scope of the present invention.

Thus, for each bit period, an 8-bit digital representation of the appropriate individual waveform portion is output (read out) from the I or Q output ports of the waveform memory 36. The 8-bit digital representations of each in-phase and quadrature waveform portion are then respectively provided to the D/A converters, 40 and 42, where they are converted to an analog representation. Accordingly, on a bit period by bit period basis, analog representations of each individual waveform portion are output by the D/A converters, 40 and 42. The in-phase (cosine) GMSK modulating signal is constructed from the individual waveform portions output from the D/A converter 40, while the quadrature (sine) GMSK modulating signal is constructed from the individual waveform portions output from the D/A converter 42. The in-phase GMSK modulating signal and the quadrature GMSK modulating signal are then respectively presented to the low pass filters, 44 and 46, in order to respectively filter the signals before being respectively presented to the in-phase mixer 50 and the quadrature mixer 52.

The in-phase GMSK modulating signal is then mixed in the in-phase mixer 50 with the RF carrier signal provided by the local oscillator 48, while the quadrature GMSK modulating signal is mixed in the quadrature mixer 52 with the RF carrier signal shifted by 90 degrees by phase shifter 54. The 90 degree phase shift is provided so that the resulting output signal of the quadrature mixer 52 will be orthogonal with respect to the output signal of the in-phase mixer 50. A GMSK modulated in-phase output signal is responsively generated by the in-phase mixer 50 and presented to the summer 56 and a GMSK modulated quadrature output signal is responsively generated by the quadrature mixer 52 and presented to the summer 56. The summer 56 combines the GMSK modulated in-phase output signal and the GMSK modulated quadrature output signal to form the GMSK output signal to be transmitted by the GMSK transmitter.

An example of the specific operation of the initial phase calculator 34, which corresponds to the example explained above in the context of the accumulated phase trellis diagram of FIG. 4, will now be given. Assuming the first three bits of the NRZ input data stream are +1 data bits, the corresponding symbol would be 000. The symbol 000 is presented to the initial phase calculator 34. A look-up table in the initial phase calculator 34, containing the phase advances listed in the second column of Table I, is used to determine the phase advance associated with symbol 000, which is 1, i.e., 90 degrees. This value is added to the previous phase advance stored in the initial phase calculator 34. Since there was no previous phase advance stored in the calculator 34, a zero is added to the phase advance of symbol 000 for a result of 90 degrees. The result of 90 degrees is stored and used to search a look up table which contains one of the four final accumulated phases associated with each symbol (as listed in Table II). Since the final accumulated phase for symbol 000 is n (see column three of Table I), n would have to equal 1 in order to yield a result of 90 degrees. Therefore, the initial phase calculator 34 outputs a binary value of "01" which represents the current initial phase associated with symbol 000. As previously mentioned, the initial calculator 34, with 2-bit output resolution, will output a binary value of "00" for n equal to 4 (0 or 360 degrees), "01" for n equal to 1 (90 degrees), "10" for n equal to 2 (180 degrees), and "1" for n equal to 3 (270 degrees). Accordingly, the symbol 000 is simultaneously presented, along with the initial phase of 01 to the waveform memory 36 in which is stored waveform portions corresponding to the four final accumulated phases (Table II). Thus, for symbol 000 and an initial phase of 01, the appropriate individual waveform portion is located and output from waveform memory 36.

If the next data bit is −1, then the current symbol becomes 001. Symbol 001 is presented to the initial phase calculator 34 where its phase advance of b or 71 degrees is determined from the look-up table and added to the previous value stored in the calculator 34 (i.e., 90 degrees). The result of the addition is 161 degrees (90+71) which is stored in the calculator 34. As explained above, the calculator 34 then determines the appropriate integer n corresponding to 161 degrees for symbol 001 from the look-up table, which is n=1 (i.e., final accumulated phase for symbol 001 is b+n, therefore, n would equal 1 to achieve the result of 71+90). Therefore, symbol 001 and an initial phase of 01 are presented to the waveform memory 36 where the appropriate individual waveform portion is located and output from waveform memory 36.

Now, if the next data bit is +1, then the current symbol becomes 010. Symbol 010 is presented to the initial phase calculator 34 where its phase advance of −b+2a or −52 degrees is determined and added to the previous value stored therein (i.e., 161 degrees). The result of the addition is 109 degrees (161+(−52)) which, as explained above, is stored. Next, as explained above, the calculator 34 then determines the appropriate integer n corresponding to 109 degrees for symbol 010, which is n=2 (i.e., final accumulated phase for symbol 010 is −b+n, therefore, n would equal 2 to achieve the result of −71+180). Therefore, symbol 010 and an initial phase of 10 are presented to the waveform memory 36 where the appropriate individual waveform portion is located and output from waveform memory 36.

It is to be appreciated that, in accordance with the present invention, each individual waveform portion of the in-phase and quadrature GMSK modulating waveforms are uniquely generated in this manner in order to respectively construct the in-phase and quadrature GMSK modulating signals used to modulate the orthogonal RF carrier signals.

Given the above detailed description of the novel operation of the present invention, one skilled in the art will realize various beneficial embodiments capable of performing GMSK modulation in accordance therewith. Nonetheless, several preferred embodiments of the present invention, for achieving the advantages associated therewith, are described below.

In a first embodiment of the present invention, a predominantly hardware-based approach is employed. Referring again to FIG. 6, it is to be appreciated that the functions of at least the S/P converter 32, the initial phase calculator 34, the sampling time controller 38 and the D/A converters, 40 and 42, may be performed by an ASIC (Application Specific Integrated Circuit) device. Accordingly, the ASIC device may be programmed such that the functions of each of the above-mentioned components may be performed by various combinations of logic gates associated with the ASIC device. For instance, the functions of the initial phase calculator 34 may be accomplished by ASIC gates forming an adder circuit and corresponding look-up tables, while the sampling time controller 38 may be accomplished by ASIC gates forming a counter circuit. In a preferred embodiment, an ASIC device may be programmed to accomplish the above-described functions with a total gate count of approximately 500. Furthermore, in a preferred ASIC embodiment, the ASIC device provides all of the input signals (i.e., current symbol, corresponding initial phase, sampling rate bits), as shown in FIG. 6, to the waveform memory 36. Also, in the ASIC embodiment, the functions of the waveform memory 36 are accomplished by at least one ROM device. As previously mentioned, two individual ROM devices may be respectively employed to generate the individual in-phase and quadrature waveform portions; however, in a preferred ASIC embodiment, only one ROM device, which preferably generates the sine (quadrature) waveform portions from the cosine (in-phase) waveform portions, is novelly employed. It is to be appreciated that in an embodiment where the D/A converters, 40 and 42, are incorporated into the ASIC device, the ASIC device provides the analog representation of the in-phase and quadrature GMSK modulating signals to the low pass filters, 44 and 46, where the signals are filtered and then passed on to the mixer portion of the modulator, as explained above.

An alternative preferred embodiment for implementing the GMSK modulation approach of the present invention is a predominantly software-based approach. This alternative approach utilizes a DSP (digital signal processor), along with the program memory and data memory associated with the DSP, to implement the advantageous features of the present invention. Specifically, the functions of the S/P converter 32, the initial phase calculator 34 and the sampling time controller 38 may be performed by the DSP under the control of software algorithms written to accomplish the same. It is to be understood that, based on the detailed description provided herein, one skilled in the art would be able to develop the appropriate software code to perform the functions associated with the present invention.

Furthermore, in a preferred DSP approach, the functions of the waveform memory 36 are accomplished by the program memory of the DSP. Because it is highly desirable to economize the number of computational cycles performed by the DSP, the program memory is partitioned to have a separate ROM device dedicated to the in-phase waveform portions (I-ROM) and a separate ROM device dedicated to quadrature waveform portions (Q-ROM), in a preferred embodiment. In this manner, computational cycles are economized by not having to derive the sine (quadrature) waveforms from the cosine (in-phase) waveforms, as is done in the preferred ASIC approach described above.

The digital representations of the in-phase and quadrature GMSK modulating signals are respectively output from the I-ROM and Q-ROM of the program memory and presented to the D/A converters, 40 and 42, where the signals are converted into analog form. As described above, the signals are then presented to the low pass filters, 44 and 46, where the signals are filtered and then passed on to the mixer portion of the modulator.

Figure 1:
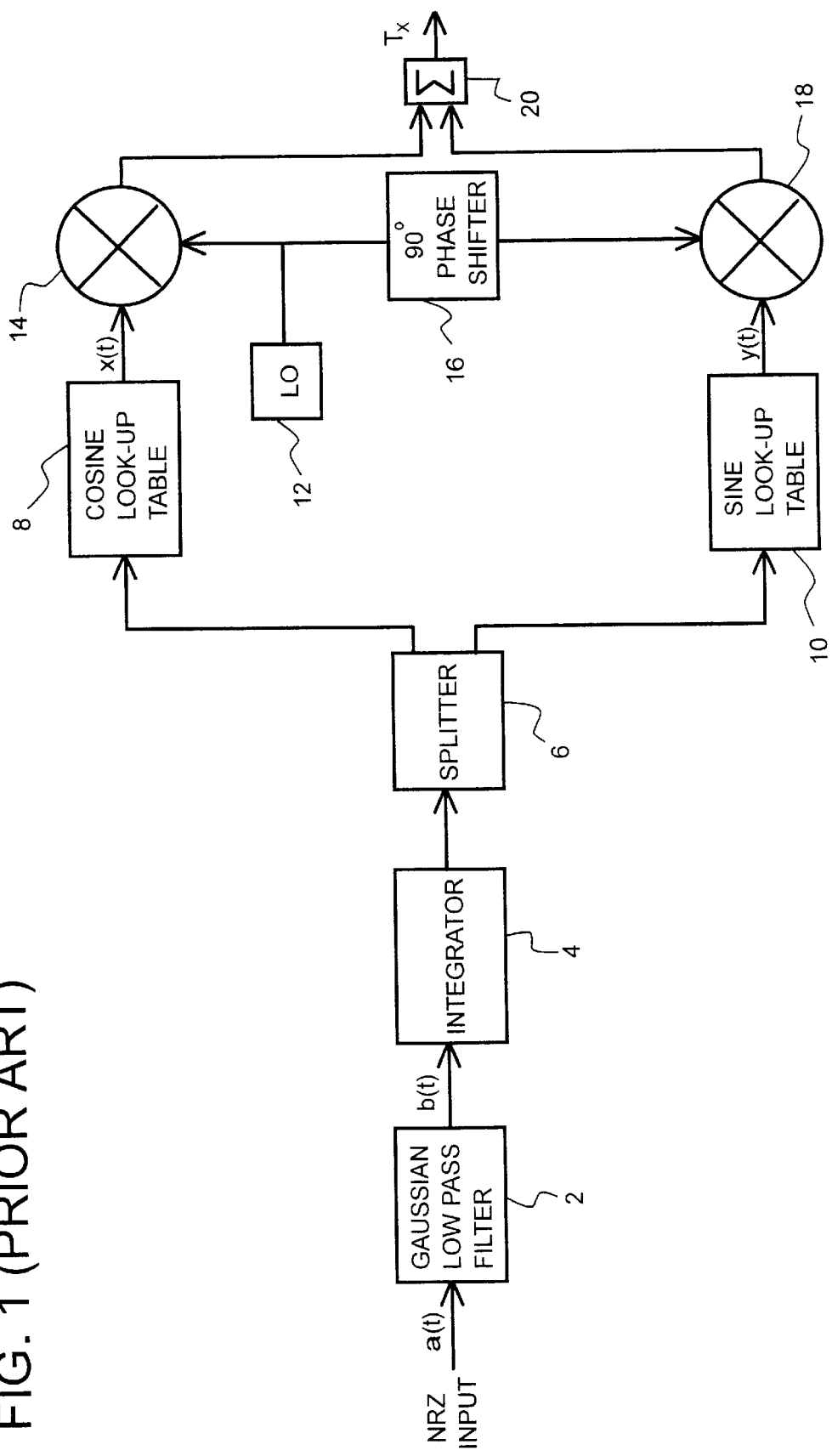
FIG. 1 is a functional block diagram of a conventional GMSK modulator.

As previously mentioned, the conventional GMSK modulator described with respect to FIG. 1 may utilize a DSP and/or ROM devices to perform certain functions. However, it is to be understood that since such prior art approach constructs the modulating signal on a sample by sample basis, the computational cycles associated with a DSP and the memory size associated with the ROM devices are significantly greater than those associated with the present invention. Given the fact that the present invention develops and utilizes the phase advance relationships that are associated with consecutive data bits of an NRZ input data bit stream and smoothed by a Gaussian filter (i.e., a bit by bit ROM-based approach), the computational cycles of the DSP and the memory size of the ROM device(s) are significantly smaller than those associated with any existing conventional GMSK modulators.

As an example, a bit by bit ROM-based GMSK modulator formed in accordance with the present invention may achieve the results described herein employing a ROM size as small as approximately 520 bytes. Also, in a preferred embodiment of the present invention, the modulating signals may be constructed by performing as few as approximately 68 computations per bit. Still further, with an 8-bit output resolution associated with the waveform memory, the present invention operates at a precision of approximately 0.2% precision. Since the prior art approach processes an individual waveform portion for every sample taken over each bit period, not only must the ROM size be substantially greater, but the number of computations are repeated each sample leading to greater monopolization of the DSP and, thus, slower overall signal processing times. Also, the precision associated with the prior art approach is inherently less than that associated with the present invention because the sample by sample prior art approach disadvantageously relies on angle approximations as compared to the bit by bit approach of the present invention which employs the actual phase advances associated with each data bit.

Although the illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for generating at least one GMSK modulating signal from a serial digital data bit stream in order that the at least one GMSK modulating signal may modulate a carrier frequency signal associated with a GMSK transmitter of a digital communications system, the method comprising the steps of:

a) converting each set of m consecutive data bits of the serial digital data bit stream into a parallel symbol, there being $2^m$ possible symbols, each symbol being generally defined as $(B_{-(m-1)}, \ldots B_0)$, where $B_0$ is a current data bit and $B_{-(m-1)}$ is an mth previous data bit with respect to $B_0$;

b) assigning a corresponding phase advance to each of the $2^m$ symbols, each phase advance being substantially equivalent to a percent phase advance contributed by m consecutive data bits of each symbol;

c) assigning at least four corresponding accumulated phases to each of the $2^m$ symbols, each of the at least four accumulated phases being derived from a multiple of 90 degrees;

d) storing a plurality of digitally represented waveform portions in a memory unit, each one of a plurality of waveform portions respectively representing a time varying waveform that advances in phase by an amount respectively equal to each one of the at least four accumulated phases assigned to each of the $2^m$ symbols;

e) adding the phase advance assigned to a current symbol to the phase advance accumulated from a previous symbol in order to yield a current accumulated phase for the current symbol;

f) searching the memory unit for the digitally represented waveform portion that corresponds to a current accumulated phase for the current symbol;

g) outputting the digitally represented waveform portion that corresponds to a current accumulated phase from the memory unit; and h) performing steps e) through g) for each data bit of a digital data bit stream to form a digital representation of the at least one GMSK modulating signal.

2. A method as defined in claim 1, further comprising the step of converting each digitally represented waveform portion, which is output from the memory unit, to an analog representation thereof in order to form a corresponding analog representation of the at least one GMSK modulating signal.

3. A method as defined in claim 2, further comprising the step of filtering the at least one GMSK modulating signal.

4. A method as defined in claim 2, further comprising the step of mixing the at least one GMSK modulating signal with the carrier frequency signal to form at least one GMSK modulated output signal.

5. A method as defined in claim 1, wherein each data bit has a data bit period associated therewith and the mth previous data bit, $B_{-(m-1)}$, contributes a percent phase advance to an mth data bit period and to each of the succeeding bit periods through and including a current data bit period.

6. A method as defined in claim 1, wherein step g) includes outputting each digitally represented waveform portion, corresponding to each data bit, one sample at a time at a predetermined sampling rate.

7. A method as defined in claim 6, wherein the sampling rate is equivalent to a fraction of a bit period associated with each data bit of the serial digital data bit stream.

8. A method as defined in claim 1, wherein m is equal to three, such that there are $2^3$ possible symbols that define possible consecutive three bit combinations of input data bits and such that each symbol is defined by three consecutive data bits in the form $(B_{-2}, B_{-1}, B_0)$, where $B_0$ is the current data bit, $B_{-1}$ is the data bit prior to $B_0$, and $B_{-2}$ is the data bit prior to $B_{-1}$.

9. A method as defined in claim 8. wherein each phase advance is substantially equivalent to a percent phase advance contributed by the three consecutive data bits associated with the symbol.

10. A method as defined in claim 8, wherein each data bit of the serial input digital data bit stream is one of a +1 data bit and a −1 data bit such that the phase advance of each of the $2^3$ symbols is represented as:

1 for symbol (+1, +1, +1)
b for symbol (+1, +1, −1)
−b+2a for symbol (+1, −1, +1)
−b for symbol (+1, −1, −1)
b for symbol (−1, +1, +1)
b−2a for symbol (−1, +1, −1)
−b for symbol (−1, −1, +1)
−1 for symbol (−1, −1, −1)

wherein 1 is substantially equivalent to 90 degrees, b is substantially equivalent to 71 degrees and a is substantially equivalent to 9.5 degrees, 2a thereby being substantially equivalent to 19 degrees.

11. A method as defined in claim 8, wherein each data bit of the serial input digital data bit stream is one of a +1 data bit and a −1 data bit such that the at least four accumulated phases of each of the $2^3$ symbols is represented as:

n for symbol (+1, +1, +1)
b+n for symbol (+1, +1, −1)
−b+n for symbol (+1, −1, +1)
n for symbol (+1, −1, −1)
n for symbol (−1, +1, +1)
b+n for symbol (−1, +1, −1)
−b+n for symbol (−1, −1, +1)
n for symbol (−1, −1, −1)

wherein n represents one of an integer 1, 2, 3 and 4 such that integers 1, 2, 3 and 4 are respectively substantially equivalent to 90, 180, 270 and 0 degrees.

12. A method as defined in claim 1, wherein at least one modulating signal is an in-phase GMSK modulating signal.

13. A method as defined in claim 1, wherein at least one modulating signal is a quadrature GMSK modulating signal.

14. A method as defined in claim 12, wherein the in-phase GMSK modulating signal is one of a sinusoidally and cosinusoidally varying signal.

15. A method as defined in claim 13, wherein the quadrature GMSK modulating signal is one of a sinusoidally and cosinusoidally varying signal.

16. A method as defined in claim 1, wherein each digitally represented waveform portion has a resolution of at least eight bits.

17. A method for performing GMSK modulation wherein an in-phase GMSK modulating signal and a quadrature GMSK modulating signal are generated from a serial digital data bit stream in order that the GMSK modulating signals may respectively modulate a first carrier frequency signal and a second carrier frequency signal associated with a GMSK transmitter of a digital communications system, the second carrier frequency signal being phase shifted by approximately 90 degrees with respect to the first carrier frequency signal, the method comprising the steps of:

a) converting each set of three consecutive data bits of the serial digital data bit stream into a parallel symbol, there being $2^3$ possible symbols, each symbol being generally defined as $(B_{-2}, B_{-1}, B_0)$, where $B_0$ is the current data bit, $B_{-1}$ is the data bit prior to $B_0$, and $B_{-2}$ is the data bit prior to $B_{-1}$;

b) assigning a corresponding phase advance to each of the $2^3$ symbols, each phase advance being substantially equivalent to a percent phase advance contributed by the three consecutive data bits of each symbol;

c) assigning at least four corresponding accumulated phases to each of the $2^3$ symbols, each of the at least four accumulated phases being derived from a multiple of 90 degrees;

d) storing a first plurality of digitally represented waveform portions in a memory unit, each one of the first plurality of digitally represented waveform portions respectively representing a cosinusoidally varying waveform that advances in phase by an amount respectively equal to each one of the at least four accumulated phases assigned to each of the $2^3$ symbols;

e) storing a second plurality of digitally represented waveform portions in the memory unit, each one of the second plurality of digitally represented waveform portions respectively representing a sinusoidally varying waveform that advances in phase by an amount respectively equal to each one of the at least four accumulated phases assigned to each of the $2^3$ symbols;

f) adding the phase advance assigned to the current symbol to the phase advance accumulated from the previous symbol in order to yield a current accumulated phase for the current symbol;

g) searching the memory unit for a digitally represented waveform portion that corresponds to the current accumulated phase for the current symbol;

h) outputting the digitally represented waveform portion that corresponds to the current accumulated phase from the memory unit; and I) performing steps f) through h) for each data bit of the digital data bit stream to form a digital representation of the in-phase GMSK modulating signal from the first plurality of waveform portions and the quadrature GMSK modulating signal from the second plurality of waveform portions;

j) converting the digitally represented waveform portion, which is output from the memory unit, to an analog representation thereof in order to form respectively corresponding analog representations of the in-phase GMSK modulating signal and the quadrature GMSK modulating signal;

k) filtering the analog representations of the in-phase GMSK modulating signal and the quadrature GMSK modulating signal;

l) mixing the in-phase GMSK modulating signal with a first carrier frequency signal to form an in-phase GMSK modulated output signal and the quadrature GMSK modulating signal with a second carrier frequency signal to form a quadrature GMSK modulated output signal; and m) summing the in-phase GMSK modulated output signal and the quadrature GMSK modulated output signal to form a composite GMSK modulated output signal for transmission by the GMSK transmitter of the digital communications system.

18. A method as defined in claim 17, wherein each data bit has a data bit period associated therewith and the data bit, $B_{-2}$, contributes a percent phase advance to each of the data bit periods associated with data bits, $B_{-2}$, $B_{-1}$ and $B_0$.

19. A method as defined in claim 17, wherein step h) includes outputting the digitally represented waveform portion, corresponding to each data bit, one sample at a time at a predetermined sampling rate.

20. A method as defined in claim 19, wherein the sampling rate is equivalent to a fraction of a bit period associated with each data bit of the serial digital data bit stream.

21. Apparatus for generating at least one GMSK modulating signal from a serial digital data bit stream in order that the at least one GMSK modulating signal may modulate a carrier frequency signal associated with a GMSK transmitter of a digital communications system, the apparatus comprising:

a serial-to-parallel (S/P) conversion circuit, the S/P conversion circuit being responsive to the serial digital data bit stream and converting each set of m consecutive data bits of the serial digital data bit stream into a parallel symbol, there being $2^m$ possible symbols, each symbol being generally defined as $(B_{-(m-1)}, \ldots B_0)$, where $B_0$ is the current data bit and $B_{-(m-1)}$ is the mth previous data bit with respect to $B_0$;

a phase calculation circuit, the phase calculation circuit being operatively coupled to the S/P conversion circuit, the phase calculation circuit storing a corresponding phase advance for each of the $2^m$ symbols, each phase advance being substantially equivalent to a percent phase advance contributed by the m consecutive data bits of each symbol, the phase calculation circuit also storing at least four corresponding accumulated phases for each of the $2^m$ symbols, each of the at least four accumulated phases being derived from a multiple of 90 degrees; and a waveform memory circuit, the waveform memory circuit being operatively coupled to the S/P conversion circuit and the phase calculation circuit, the waveform memory circuit storing a plurality of digitally represented waveform portions, each one of a plurality of waveform portions respectively representing a time varying waveform that advances in phase by an amount respectively equal to each one of the at least four accumulated phases associated with each of the $2^m$ symbols;

wherein:

the S/P conversion circuit presents a current symbol to the phase calculation circuit and the phase calculation circuit adds the phase advance associated with the current symbol to the phase advance accumulated from a previous symbol in order to yield a current accumulated phase for the current symbol;

the phase calculation circuit presents the current accumulated phase to the waveform memory circuit, while the S/P conversion circuit also presents the current symbol to the waveform memory circuit, in response thereto, the waveform memory circuit is searched to locate the digitally represented waveform portion that corresponds to the current accumulated phase for the current symbol;

the waveform memory circuit outputs the digitally represented waveform portion that corresponds to the current accumulated phase for the current symbol such that a waveform portion is output from the waveform memory circuit for each data bit of the digital data bit stream to form a digital representation of the at least one GMSK modulating signal.

22. Apparatus as defined in claim 21, further comprising a digital-to-analog (D/A) conversion circuit, the D/A conversion circuit being operatively coupled to the waveform memory circuit and converting each digitally represented waveform portion, which is output from the waveform memory circuit, to an analog representation thereof in order to form a corresponding analog representation of the at least one GMSK modulating signal.

23. Apparatus as defined in claim 22, further comprising a filtering circuit, the filter circuit being operatively coupled to the D/A conversion circuit and filtering the at least one GMSK modulating signal.

24. Apparatus as defined in claim 23, further comprising a mixing circuit, the mixing circuit being operatively coupled to the filtering circuit and mixing the at least one GMSK modulating signal with the carrier frequency signal to form at least one GMSK modulated output signal.

25. Apparatus as defined in claim 21, wherein each data bit has a data bit period associated therewith and the mth previous data bit, $B_{-(m-1)}$, contributes a percent phase advance to the mth data bit period and to each of the succeeding bit periods through and including the current data bit period.

26. Apparatus as defined in claim 21, further comprising a sampling time control circuit, the sampling time control circuit being operatively coupled to the waveform memory circuit such that the waveform memory circuit outputs each digitally represented waveform portion, corresponding to each data bit, one sample at a time according to a predetermined sampling rate associated with the sampling time control circuit.

27. Apparatus as defined in claim 26, wherein the sampling rate associated with the sampling time control circuit is equivalent to a fraction of a bit period associated with each data bit of the serial digital data bit stream.

28. Apparatus as defined in claim 21, wherein the S/P conversion circuit sets m equal to three, such that there are $2^3$ possible symbols that define the possible consecutive three bit combinations of input data bits and such that each symbol is defined by three consecutive data bits in the form $(B_{-2}, B_{-1}, B_0)$, where $B_0$ is the current data bit, $B_{-1}$, is the data bit prior to $B_0$, and $B_{-2}$ is the data bit previous to $B_{-1}$.

29. Apparatus as defined in claim 28, wherein each phase advance stored in the phase calculation circuit is substantially equivalent to a percent phase advance contributed by the three consecutive data bits associated with the symbol.

30. Apparatus as defined in claim 28, wherein each data bit of the serial input digital data bit stream is one of a +1 data bit and a −1 data bit such that the phase advance of each of the $2^3$ symbols is represented as:

1 for symbol (+1, +1, +1)
   b for symbol (+1, +1, −1)
   −b+2a for symbol (+1, −1, +1)
   −b for symbol (+1, −1, −1)
   b for symbol (−1, +1, +1)
   b−2a for symbol (−1, +1, −1)
   −b for symbol (−1, −1, +1)
   −1 for symbol (−1, −1, −1)

wherein 1 is substantially equivalent to 90 degrees, b is substantially equivalent to 71 degrees and a is substantially equivalent to 9.5 degrees, 2a thereby being substantially equivalent to 19 degrees.

31. Apparatus as defined in claim 28, wherein each data bit of the serial input digital data bit stream is one of a +1 data bit and a −1 data bit such that the at least four accumulated phases of each of the $2^3$ symbols is represented as:

n for symbol (+1, +1, +1)
   b+n for symbol (+1, +1, −1)
   +b+n for symbol (+1, −1, +1)
   n for symbol (+1, −1, −1)
   n for symbol (−1, +1, +1)
   b+n for symbol (−1, +1, −1)
   −b+n for symbol (−1, −1, +1)
   n for symbol (−1, −1, −1)

wherein n represents one of an integer 1, 2, 3 and 4 such that integers 1, 2, 3 and 4 are respectively substantially equivalent to 90, 180, 270 and 0 degrees.

32. Apparatus as defined in claim 21, wherein the at least one GMSK modulating signal is an in-phase GMSK modulating signal.

33. Apparatus as defined in claim 21, wherein the at least one GMSK modulating signal is a quadrature GMSK modulating signal.

34. Apparatus as defined in claim 32, wherein the in-phase GMSK modulating signal is one of a sinusoidally and cosinusoidally varying signal.

35. Apparatus as defined in claim 33, wherein the quadrature GMSK modulating signal is one of a sinusoidally and cosinusoidally varying signal.

36. Apparatus as defined in claim 21, wherein the waveform memory circuit has an output resolution, with respect to the digitally represented waveform portions, of at least eight bit associated therewith.

37. Apparatus for performing GMSK modulation wherein an in-phase GMSK modulating signal and a quadrature GMSK modulating signal are generated from a serial digital data bit stream in order that the GMSK modulating signals may respectively modulate a first carrier frequency signal and a second carrier frequency signal associated with a GMSK transmitter of a digital communications system, the second carrier frequency signal being phase shifted by approximately 90 degrees with respect to the first carrier frequency signal, the apparatus comprising:

a serial-to-parallel (S/P) conversion circuit, the S/P conversion circuit being responsive to the serial digital data bit stream and converting each set of three consecutive data bits of the serial digital data bit stream into a parallel symbol, there being $2^3$ possible symbols, each symbol being generally defined as $(B_{-2}, B_{-1}, B_0)$, where Bo is the current data bit, $B_{-1}$ is the data bit prior to $B_0$, and $B_{-2}$ is the data bit prior to $B_{-1}$;

a phase calculation circuit, the phase calculation circuit being operatively coupled to the S/P conversion circuit, the phase calculation circuit storing a corresponding phase advance for each of the $2^3$ symbols, each phase advance being substantially equivalent to a percent phase advance contributed by the three consecutive data bits of each symbol, the phase calculation circuit also storing at least four corresponding accumulated phases for each of the $2^3$ symbols, each of the at least four accumulated phases being derived from a multiple of 90 degrees;

a waveform memory circuit, the waveform memory circuit being operatively coupled to the S/P conversion circuit and the phase calculation circuit, the waveform memory circuit storing a first plurality of digitally represented waveform portions, each one of the first plurality of digitally represented waveform portions respectively representing a cosinusoidally varying waveform that advances in phase by an amount respectively equal to each one of the at least four accumulated phases associated with each of the $2^3$ symbols, the waveform memory circuit also storing a second plurality of digitally represented waveform portions, each one of the second plurality of digitally represented waveform portions respectively representing a sinusoidally varying waveform that advances in phase by an amount respectively equal to each one of the at least four accumulated phases associated with each of the $2^3$ symbols;

a digital-to-analog (D/A) conversion circuit, the D/A conversion circuit being operatively coupled to the waveform memory circuit and converting each digitally represented waveform portion, which is output from the waveform memory circuit, to an analog representation thereof;

a filtering circuit, the filter circuit being operatively coupled to the D/A conversion circuit;

a mixing circuit, the mixing circuit being operatively coupled to the filtering circuit and including a local oscillator circuit which generates the first and second carrier frequency signals; and a summing circuit, the summing circuit being operatively coupled to the mixing circuit;

wherein:

the S/P conversion circuit presents a current symbol to the phase calculation circuit and the phase calculation circuit adds the phase advance associated with the current symbol to the phase advance accumulated from a previous symbol in order to yield a current accumulated phase for the current symbol;

the phase calculation circuit presents the current accumulated phase to the waveform memory circuit, while the S/P conversion circuit also presents the current symbol to the waveform memory circuit, in response thereto, the waveform memory circuit is searched to locate the digitally represented waveform portion that corresponds to the current accumulated phase for the current symbol;

the waveform memory circuit outputs the digitally represented waveform portion that corresponds to the current accumulated phase for the current symbol such that a waveform portion is output from the waveform memory circuit for each data bit of the digital data bit stream to form a digital representation of the in-phase GMSK modulating signal from the first plurality of waveform portions and the quadrature GMSK modulating signal from the second plurality of waveform portions;

the D/A conversion circuit respectively converts the digital representation of the in-phase GMSK modulating signal and the quadrature GMSK modulating signal to an analog representation of the in-phase GMSK modulating signal and the quadrature GMSK modulating signal;

the filtering circuit respectively filters the analog representations of the in-phase GMSK modulating signal and the quadrature GMSK modulating signal;

the mixing circuit mixes the in-phase GMSK modulating signal with the first carrier frequency signal to form an in-phase GMSK modulated output signal and mixes the quadrature GMSK modulating signal with the second carrier frequency signal to form a quadrature GMSK modulated output signal;

the summing circuit sums the in-phase GMSK modulated output signal and the quadrature GMSK modulated output signal to form a composite GMSK modulated output signal for transmission by the GMSK transmitter of the digital communications system.

38. Apparatus as defined in claim 37, wherein each data bit has a data bit period associated therewith and the data bit, $B_{-2}$, contributes a percent phase advance to each of the data bit periods associated with data bits, $B_{-2}$, $B_{-1}$ and $B_0$.

39. Apparatus as defined in claim 37, further comprising a sampling time control circuit, the sampling time control circuit being operatively coupled to the waveform memory circuit such that the waveform memory circuit outputs each digitally represented waveform portion, corresponding to each data bit, one sample at a time according to a predetermined sampling rate associated with the sampling time control circuit.

40. Apparatus as defined in claim 39, wherein the sampling rate associated with the sampling time control circuit is equivalent to a fraction of a bit period, associated with each data bit of the serial digital data bit stream.

* * * * *

UNITED STATES PATENT AND TRADEMARK OFFICE
CERTIFICATE OF CORRECTION

PATENT NO. : 6,025,758
DATED : February 15, 2000
INVENTOR(S) : Keh-Shehn Lu

It is certified that error appears in the above-identified patent and that said Letters Patent is hereby corrected as shown below:

In Column 1, line 64, "summer" should be --summer 20 --;

In Column 15, line 33, "e.g(" should be -- e.g., --; and

In Column 25, line 39 (Claim 31) "+b+n" should be -- -b+n --.

Signed and Sealed this

Ninth Day of January, 2001

*Attest:*

Q. TODD DICKINSON

*Attesting Officer*    *Commissioner of Patents and Trademarks*